Jan. 10, 1961 R. B. LAWRANCE ET AL 2,967,674

WEB TENSIONER

Filed May 5, 1958

INVENTORS:
Richard B. Lawrance
and Robert A. Pendleton,

BY Bair, Freeman & Molinare
ATTORNEYS.

United States Patent Office 2,967,674

Patented Jan. 10, 1961

2,967,674

WEB TENSIONER

Richard B. Lawrance, Winchester, and Robert A. Pendleton, Dedham, Mass., assignors to Minneapolis-Honeywell Regulator Company, Minneapolis, Minn., a corporation of Delaware Filed May 5, 1958, Ser. No. 734,074

11 Claims. (Cl. 242—75.2)

This invention relates generally to apparatus for handling flexible members, and more particularly to new and improved apparatus for facilitating the handling of an elongated tape such as a record tape having information stored thereon.

It is known to store information on an elongated tape of the type having a magnetizable surface. Generally, the information is written onto and read out of the tape by a suitable data transfer head positioned adjacent the tape. The tape is moved past the transfer head by means of tape driving capstans, or the like.

In some types of tape handling apparatus, such as those used in the field of data processing, the record tape conveniently is wound on a pair of supply reels which are adapted to be reversibly driven by suitable motor means, and the tape is arranged to pass from each supply reel through a loop chamber to a driving capstan. Generally, the supply reels are operated intermittently, with frequent starting, stopping, and reversals of motion.

The tape when wound on a supply or take-up reel is preferably wound so that as the reel is driven, there will be no slipping of the tape between the various layers thereof on the reel. The tape when so wound would have a hard or firm feel indicating no space or voids between layers. In the event that the tape is not tightly wound on the reel, the tape will slip when started and stopped. Such slipping will cause bulging of the tape and may produce permanent wrinkles in the tape which render it useless at the point where the wrinkling occurs.

Commonly, pressure differentials are provided in the loop chambers and this serves to maintain the tape under tension due to the action of the atmospheric pressure exerted on one side of the tape and a sub-atmospheric pressure acting on the other side of the tape by suitable suction means positioned thereat.

The pressures acting on the tape in the loop chambers are selected to maintain a uniform tension on the tape in its relation to the data transfer head. This tension is frequently not adequate for purposes of effecting a tight or hard winding on the take-up reel. Consequently, additional means are required at the take-up reel to increase the tension on the tape during a take-up.

Accordingly, it is a general object of this invention to provide new and improved tape tensioning means for a tape handling apparatus.

More specifically, it is an object of this invention to provide means for maintaining a record tape under tension as it is fed onto a take-up or supply reel to the end that the tape can be tightly wound upon the reel without having pockets or bulges formed therein.

It is another object of this invention to provide a unidirectional tensioner for a record tape which serves to tension the tape as it is wound upon a reel while allowing the tape to ride freely as it is unwound from the reel.

It is another object of this invention to provide a unidirectional tape tensioner, as described above, in which sub-atmospheric pressures are applied to tension the tape as it is wound upon the reel.

It is a further object of this invention to provide valve means responsive to the direction of tape travel for supplying sub-atmospheric pressures to the tape to tension the same while it is traveling in a predetermined direction.

It is a still further object of this invention to provide a new and improved tape tensioner which is characterized by its efficiency, and its relatively low cost of construction and operation.

These and other objects are realized in accordance with a specific illustrative embodiment of this invention in which the tape tensioner takes the form of a pneumatic drag assembly positioned adjacent each of the supply reels in the tape handling apparatus. In accordance with a feature of this invention, the tape drag assembly comprises a valve body to which is pivoted a bracket having a tape drag member fixed at one end thereof.

The tape drag member is provided with a plurality of arcuate grooves to which atmospheric pressure is communicated when the bracket is pivoted to one of its two operating states, and to which sub-atmospheric pressure is communicated when the bracket is pivoted to its other operating state. In accordance with further features of this invention, the tape normally passes over the arcuate grooves in the tape drag member, and as the tape is being fed from a reel across the drag member, the bracket is pivoted to close the valve and cause atmospheric pressure to be applied to the tape through a suitable bleed port. Consequently, when the tape travels in this direction, it rides freely over the tape drag assembly.

When the tape is passed over the drag member as it is fed onto the supply reel, however, the bracket is pivoted in the other direction to open the valve and cause sub-atmospheric pressure to be applied through the grooves in the tape drag member to the tape. This sub-atmospheric pressure pulls in the tape against the tape drag member to tension the tape and thereby assure that the tape is tightly wrapped upon the reel as the latter winds up the tape.

The above and other features of novelty which characterize the invention are pointed out with particularity in the claims appended to and forming a part of this specification. For a better understanding of the invention, its advantages, and specific objects attained by its use, reference is had to the accompanying drawing and descriptive matter in which is shown and described an illustrative embodiment of the invention.

Figures 1, 4, 5:
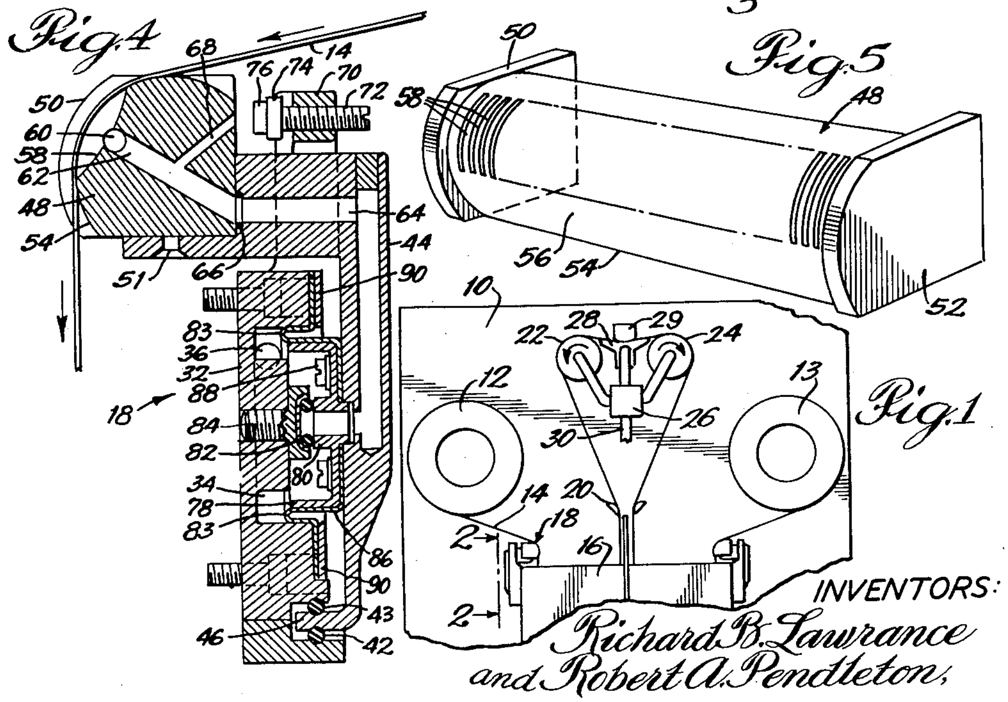
Figure 1 is a diagrammatic showing of a portion of a tape handling apparatus embodying the present invention.
Figure 4 is a cross-sectional view of the invention taken substantially as shown on line 3—3 of Figure 2 showing the invention in tape free riding position.
Figure 5 is a perspective view of the tape drag member and tape guide assembly embodied in the invention.

Referring now to the drawing, and more particularly to Figure 1, the numeral 10 represents a panel or support upon which are mounted the components used in the illustrative tape handling apparatus embodying the invention. Carried by the support 10 are a pair of tape supply reels, such as the reels 12 and 13, which are arranged to be reversibly driven by a suitable motor means, not shown. The supply reels carry a tape 14 which may conveniently take the form of a magnetic tape upon which information may be stored by means of electrical impulses.

The tape 14 is arranged to pass from each supply reel through an associated loop chamber which advantageously is arranged to maintain the tape 14 under tension due to the action of the atmospheric pressure exerted on top of the tape and opposed by a reduced pressure under the tape. Conveniently, this pressure differential on opposite sides of the tape may be created by suitable suction means provided in the loop chamber.

For example, in accordance with the invention, the tape 14 is guided into the loop chamber 16 by a uni-directional tape tensioner identified generally at 18, and the tape is guided out of the loop chamber 16 by a suitable guide pin 20. The air pressure differential in the loop chamber 16 functions to maintain the tape 14 under a first level of tension while it is in the loop chamber 16 and, as described in greater detail below, the uni-directional tape tensioner 18 functions to produce an additional tensioning force on the tape 14 as it is fed onto the supply reel 12. As it will become evident from the description below, the tape tensioner 18 operates in a novel manner to provide additional tension on the tape as it is wound so that when on the reel, it will be impossible for the tape to slide and form pockets as it is wound on the supply reel 12. Further, the tensioning means 18 permits the tape to ride freely as it is unwound from the supply reel and fed into the loop chamber.

A data transfer head 29 is positioned to engage the tape 14 so that information may be recorded upon or read from the tape as it is moved at a predetermined speed past the information transfer head. The movement of the tape 14 past transfer head 29 is effected by a pair of contra-rotating capstans 22 and 24, which advantageously are of the pneumatic type.

Thus, if it is desired to drive the tape 14 from left to right past the transfer head 29, the driving capstan 24 is actuated by a pneumatic switch assembly 26 so that a sub-atmospheric pressure is applied to the capstan 24 to draw the tape into engagement with the capstan and thereby drive the tape in the desired direction. Should it be desired to move the tape in the opposite direction, the capstan 22 is actuated by the application of a sub-atmospheric pressure thereto by the pneumatic switch assembly 26, and this causes the tape to be drawn against the capstan 22 for moving the tape from right to left as shown in Figure 1.

The braking of the tape 14 with respect to the transfer head 29 is accomplished by the brake member 28, also of the pneumatic type. Thus, when the pneumatic switch assembly 26 disconnects the sub-atmospheric pressure from the previously tape driving capstan 22 or 24, and applies the sub-atmospheric pressure from the inlet conduit 30 to the brake member 28, the tape is drawn against the face of the brake and the tape movement is thereby stopped.

The details of the tape tensioner 18 which functions to tension the tape 14 as it is wound upon the supply reel 12 are shown in Figures 2 to 5 of the drawing. In one advantageous embodiment, the tape tensioner 18 comprises a valve body 32 which is formed with an annular recess 34 at the inner face thereof. A vacuum port 36 is formed in valve body 32 and one end of the vacuum port 36 opens into the annular recess 34, while the other end of the vacuum port 36 extends through the body 32 to a connecting seal 38 at one side of the valve body. Advantageously, the connecting seal 38 is adapted to be connected to any suitable source of sub-atmospheric pressure such that a sub-atmospheric pressure can be communicated to the recess 34.

Figure 3:
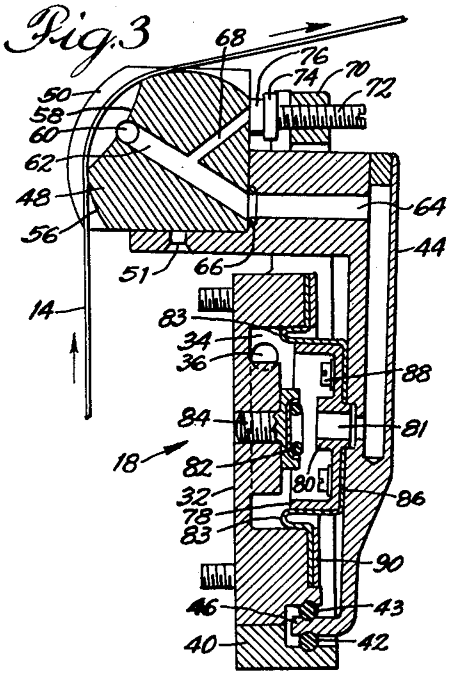
Figure 3 is a cross-sectional view taken substantially as shown on line 3—3 of Figure 2 showing the invention in tape tensioning position.
Figure 2:
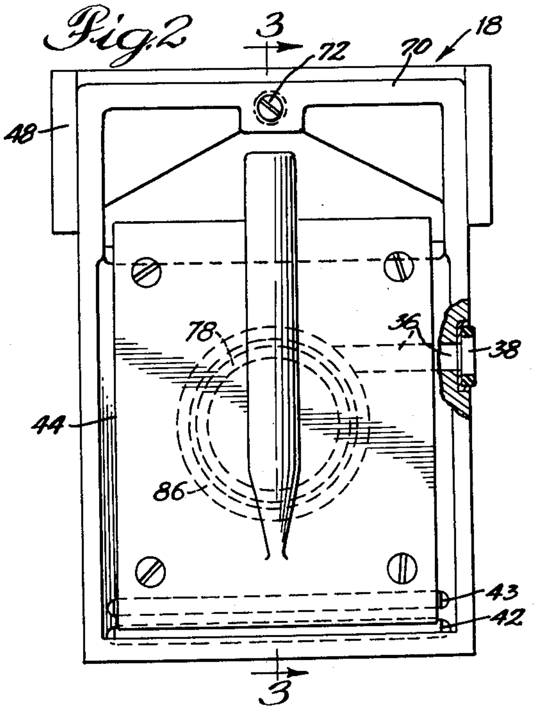
Figure 2 is an elevational view of the invention taken substantially as shown along line 2—2 of Figure 1.

A pivot cap 40 is secured to the bottom edge of the valve body 32 and the inner faces of the valve body 32 and pivot cap 40 are recessed to receive a pair of spaced resilient strips 42 and 43 which advantageously may be formed of rubber or the like. A bracket 44 is provided with a flange 46 at its lower end and flange 46 is inserted between spaced resilient strips 42 and 43 so that the bracket 44 may be pivoted into one or two operating positions—namely, counter-clockwise against the valve body 32, or clockwise away from the valve body 32, as shown in Figures 3 and 4, respectively.

A tape drag assembly 48 is secured to the upper end of the bracket 44 by any suitable means, such as screw fasteners 51 or the like. Advantageously, the tape drag assembly 48 is formed by a pair of flat, vertically positioned tape guides 50 and 52 having a transverse tape drag head 54 positioned therebetween and supported thereby. Tape drag head 54 is formed with an arcuate tape receiving surface 56 in which is provided a plurality of grooves or slots 58 extending across the arcuate surface 56 from one tape guide to the other. Advantageously, grooves 58 may be formed in arcuate surface 56 by milling of the drag head or by any other suitable means.

The grooves 58 extend into transverse opening 60 extending the width of the tape drag head 54 and the opening 60, in turn, is in communication with a port 62 extending diagonally through the central portion of the tape drag head 54 from the opening 60 to a vacuum or sub-atmospheric pressure port 64 in the bracket 44. The junction of the port 62 in the tape drag head 54 and the vacuum or sub-atmospheric pressure port 64 in the bracket 44 may be sealed by any suitable means such as the O ring 66 to permit sub-atmospheric pressures in the pressure port 64 to be communicated to the arcuate grooves or slots 58 in the tape drag head.

A bleed port 68 is provided in the tape drag head 54 between the port 62 and the rear surface of the head to enable atmospheric pressures to be communicated to the arcuate grooves or slots 58. The valve body 32 is formed with an extension 70 extending upwardly of the main portion of the valve body and a stop screw 72 is threaded therein. The head 74 of stop screw 72 advantageously has a resilient or rubber valve stop 76 cemented thereto and it can be seen that when the bracket 44 is pivoted outwardly and away from the valve body 32, the head 54 of the tape drag assembly 48 comes to rest against the rubber valve stop 76 to limit the clockwise rotation of the bracket 44. Preferably, the rubber valve stop 76 is formed with a diameter greater than the diameter of the bleed port 68 so that when the tape drag head 54 abuts the rubber stop 76, the bleed port 68 is sealed by the rubber valve stop to prevent atmospheric pressure from being communicated to the arcuate grooves 58.

The sub-atmospheric pressure port 64 in bracket 44 extends downwardly through the bracket into communication with an opening 81 in a valve cup 78. The opening 81 in valve cup 78 is formed in an annular embossment 80 which is adapted to be placed into sealing engagement with a valve seat formed by an O ring 82 when the bracket 44 is pivoted to its counter-clockwise position. The O ring 82 is positioned in a valve seat screw 84 threaded through the valve body 32 and therefore it can be seen that when bracket 44 is pivoted to its counter-clockwise position, as shown in Figure 3, the sub-atmospheric pressure supplied through port 36 in the valve body is communicated through the opening 81 in valve cup 78, pressure port 64 in bracket 44, and port 62 in the tape drag member 48 to the arcuate grooves 58 in the tape drag head 56. As explained above, the bleed port 68 is closed at this time to prevent atmospheric pressure from being communicated to grooves 58. On the other hand, when bracket 44 is pivoted to its counter-clockwise position as shown in Figure 4, the embossment 80 of the valve cup 78 is in sealing engagement with the O ring 82 to prevent the sub-atmospheric pressure therein from being communicated to the grooves 58 in the tape drag head 56. At this time, as explained above, atmospheric pressure is communicated through the bleed port 68 to grooves 58.

The valve cup 78 is adapted to be pivoted in and out of sealing engagement with the valve seat 82 without undesired loss of sub-atmospheric pressure by means of a pressure chamber defined by the recess 34 and a diaphragm 86 fitted around the valve cup 78 and secured thereto by means of suitable fasteners such as the screws 88. The peripheral edges of the diaphragm 86 are fastened to the valve body 32 by suitable retainer members 90 to completely enclose the pressure chamber except during the times the bracket is pivoted in the clockwise direction to permit the sub-atmospheric pressure in the pressure chamber to be communicated to the grooves in the tape drag head. It will be appreciated by those skilled in the art that the U shaped seal 83 in the diaphragm 86 between the outer walls of the valve cup 78 and the recess walls of the valve body 32 provides substantial flexibility for the inward and outward movement of valve cup 78 in response to the pivotal rotation of bracket 44. It further will be appreciated that the diaphragm 86 will be formed of a material chosen to facilitate this bellows-like movement.

In the operation of the tape tensioner, the tape is caused to pass over the arcuate grooves 58 in the tape drag head 54 when the tape is wound onto or unwound from a supply reel. The tape is guided in this action by the tape guides 50 and 52 at opposite ends of the drag head 54. When the tape is being unwound from a reel as shown in Figure 4, the tape movement pivots the bracket 44 in a counter-clockwise direction and the atmospheric pressure communicated to the tape, through the ports 68 and 62 and the grooves 58, enables the tape to ride freely over the tape drag head 54, as it is pulled across the head by the pressure differential in the loop chamber.

When the tape is being wound on a take-up reel, however, as shown in Figure 3, the movement of the tape pivots the bracket 44 in the clock-wise direction to seal off the atmospheric bleed port 68 and open the ports 80—82 to cause the sub-atmospheric pressures to be communicated to the tape through the grooves 58. The resultant pressure differential existing on opposite sides of the tape causes the tape to be drawn against the tape drag head 54 to tension the tape as it is being wound on the take-up reel. This tensioning of the tape as it is being fed onto the take-up reel provides a firm wind-up of the tape so that the tape cannot slide and form pockets or budge on the reel.

When the tape wind-up has stopped, the sub-atmospheric pressure acting on the seal 83 tends to move the head 54 away from its sealed position where the stop 76 seals the port 68. This will break the pressure differential acting on the tape and it will be free to move without further tensioning if the tape should be unwound from the reel.

There has been shown and described a novel unidirectional tape tensioner which is adapted to be operated in response to the direction of tape movement to tension the tape as it is being wound onto a supply reel while permitting the tape to ride freely as it is being unwound from the supply reel. This operation is completely automatic as the tape tensioner is responsive to the direction of tape travel, and therefore, no manual monitoring of the tape operation is required.

It will be appreciated by those skilled in the art that modifications may be made in the construction and arrangement of the parts of the above-described uni-directional tape tensioner without departing from the real spirit and purpose of the invention and that it is intended to cover by the appended claims any modified forms of structure or use of equivalents which may be reasonably included within their scope.

What we claim as our invention is:

1. A unidirectional tape tensioner for a tape handling apparatus comprising a valve body positioned in operative association with a tape take-up and supply reel, means for supplying sub-atmospheric pressure to said valve body, an operating member pivoted to said valve body, said operating member having a tape engaging head at one end thereof, vacuum port means in said operating member for communicating said sub-atmospheric pressure to said tape engaging head to tension the tape, bleed port means in said tape engaging head for supplying atmospheric pressure to said tape to enable the latter to freely ride over said head, and separate valve means for said vacuum port and bleed port means responsive to the direction of tape travel for closing the vacuum port means and opening the bleed port means when the tape is unwound from the reel, and for opening the vacuum port means and closing the bleed port means when the tape is wound upon said reel.

2. A unidirectional tape tensioner for a tape handling apparatus comprising a valve body having formed therein a pressure chamber and a port for supplying sub-atmospheric pressure to said pressure chamber, a bracket pivotally mounted to said valve body and responsive to the direction of tape travel for assuming either of two operating positions to open or close said pressure chamber, a tape drag member secured to said bracket, said tape drag member being formed with an apertured tape receiving surface, a bleed port formed in said tape drag member for communicating atmospheric pressure to said apertured tape receiving surface when said bracket is pivoted to close said chamber, a pressure port formed in said bracket for communicating sub-atmospheric pressure to said apertured tape receiving surface from said pressure chamber when said bracket is pivoted to open said chamber, valve means associated with said chamber for closing said pressure port when said bleed port is opened and valve means associated with said tape drag member for closing said bleed port when said pressure port is open.

3. A unidirectional tape tensioner for a tape handling apparatus comprising a valve body having formed therein a pressure chamber and a port for supplying sub-atmospheric pressure to said pressure chamber, a bracket pivotally mounted to said valve body and capable of assuming either of two operating positions to open or close said pressure chamber, a tape drag member secured to said bracket, said tape drag member being formed with an apertured tape receiving surface, and a pressure port formed in said bracket for communicating sub-atomspheric pressure from said pressure chamber to said apertured tape receiving surface only when said bracket is pivoted to open said chamber.

4. A unidirectional tape tensioner for a tape handling apparatus comprising a support bracket responsive to the direction of tape travel for assuming either of two operating positions, a tape drag member carried by said support bracket, said tape drag member being formed with an apertured tape receiving surface, and valve means operated in accordance with the position of said support bracket for enabling sub-atmospheric pressure to be supplied to the apertured tape receiving surface of said tape drag member when the tape is traveling in one direction and for preventing sub-atmospheric pressure from being supplied to said apertured tape receiving surface when the tape is traveling in the opposite direction.

5. A unidirectional tape tensioner for a tape handling apparatus in accordance with claim 4 further comprising further valve means operated in accordance with the position of said support bracket for supplying atmospheric pressure to said apertured tape receiving surface when said tape is traveling in said opposite direction.

6. A unidirectional tape tensioner for a tape handling apparatus comprising a valve body having a recess formed therein, a bracket pivotally mounted to said valve body and responsive to the direction of tape travel for assuming either of two operating positions, diaphragm means carried by said bracket in cooperating relation with said recess to form a chamber adapted to receive sub-atmospheric pressure, a tape drag member having an apertured tape receiving surface and valve means for said chamber operated by said bracket for communicating sub-atmospheric pressure to said tape receiving surface when said bracket is pivoted to one of its operating positions by the action of the tape traveling in one direction and for sealing said chamber to cut off the sub-atmospheric pressure from the tape receiving surface when said bracket is pivoted to its other operating position by the action of the tape traveling in the opposite direction.

7. Control apparatus for a record tape comprising a pair of spaced contra-rotating capstans for driving the tape selectively in opposite directions, a supply and take-up reel associated with each of said capstans, an information transfer head positioned in the space between said capstans and adapted to engage the tape for effecting information transfer therebetween, and unidirectional tape tensioning means positioned between each capstan and its associated reel for tensioning the tape as it is driven from the capstan to the reel to enable the tape to be tightly wound upon the reel, and for permitting the tape to travel freely as it is driven from the reel to the capstan.

8. Control apparatus for a record tape in accordance with claim 7 wherein said unidirectional tape tensioning means comprises valve means actuated in response to the direction of tape travel for applying sub-atmospheric pressure to the tape only when the tape is driven from the capstan to the reel.

9. Control apparatus for a record tape in accordance with claim 8 further comprising additional valve means actuated in response to the direction of tape travel for applying atmospheric pressure to the tape when the tape is driven from the reel to the capstan.

10. A unidirectional tape tensioner for a tape handling apparatus of the type having at least one tape driving capstan and a take-up and supply reel associated therewith comprising a source of sub-atmospheric pressure, and valve means controlled by the direction of tape travel for supplying said sub-atmospheric pressure to one side of the tape to tension the tape as it is driven from the capstan to the reel to cause the tape to be tightly wound upon the take-up reel, and for preventing said sub-atmospheric pressure from being supplied to the tape to enable the tape to be freely driven from the reel to the capstan.

11. A tape tensioner as defined in claim 10 wherein said valve means comprises a pneumatic means adapted to close said valve means when said tape has stopped moving in a direction to open said valve means.

References Cited in the file of this patent

UNITED STATES PATENTS

| | | |
|---|---|---|
| 2,384,650 | Sjogren | Sept. 11, 1945 |
| 2,635,824 | Schneider | Apr. 21, 1953 |
| 2,746,749 | Huck | May 22, 1956 |
| 2,778,634 | Gams | Jan. 22, 1957 |
| 2,846,217 | Bormann et al. | Aug. 5, 1958 |

FOREIGN PATENTS

| | | |
|---|---|---|
| 165,510 | Switzerland | Mar. 1, 1934 |